Patented Nov. 11, 1924.

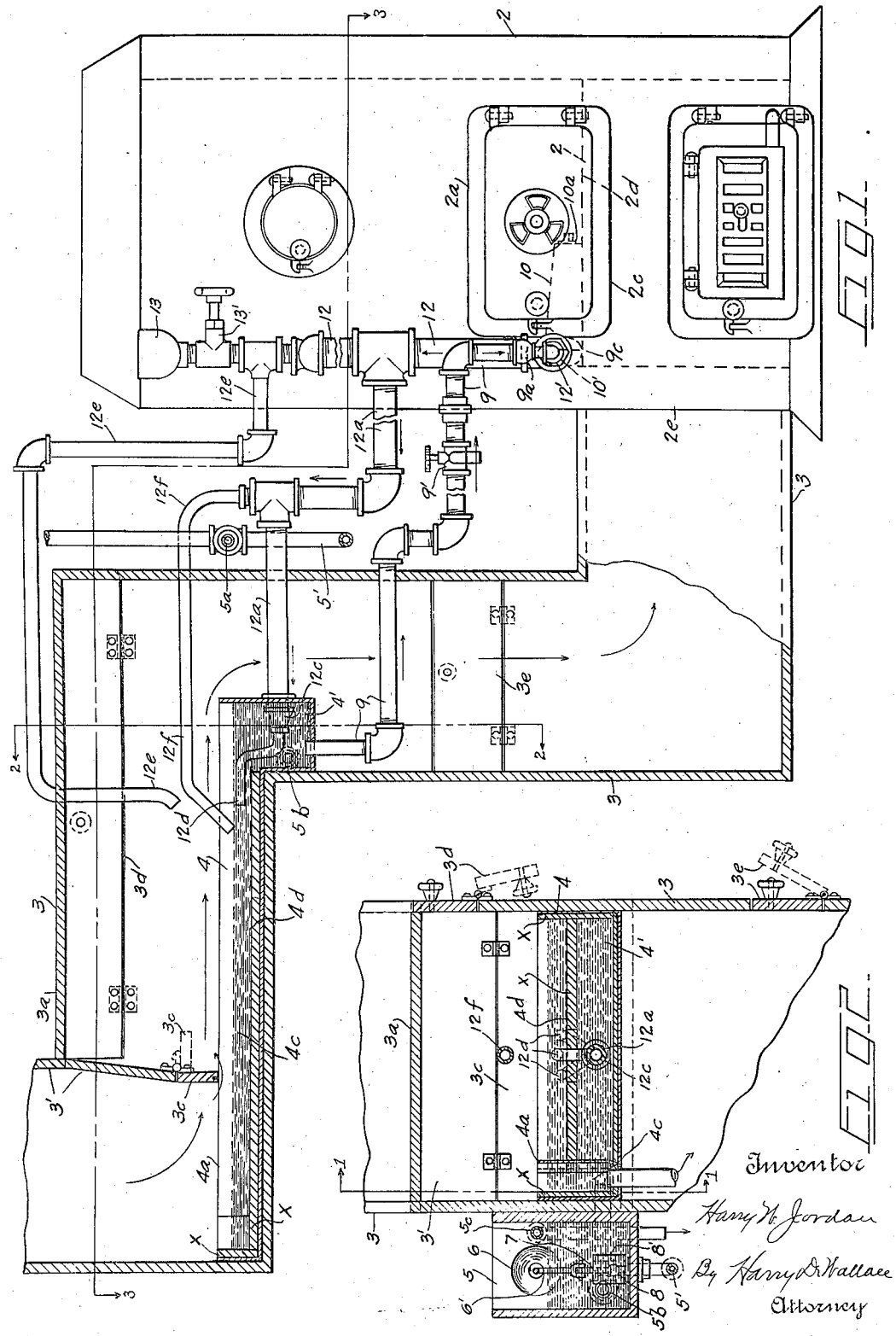

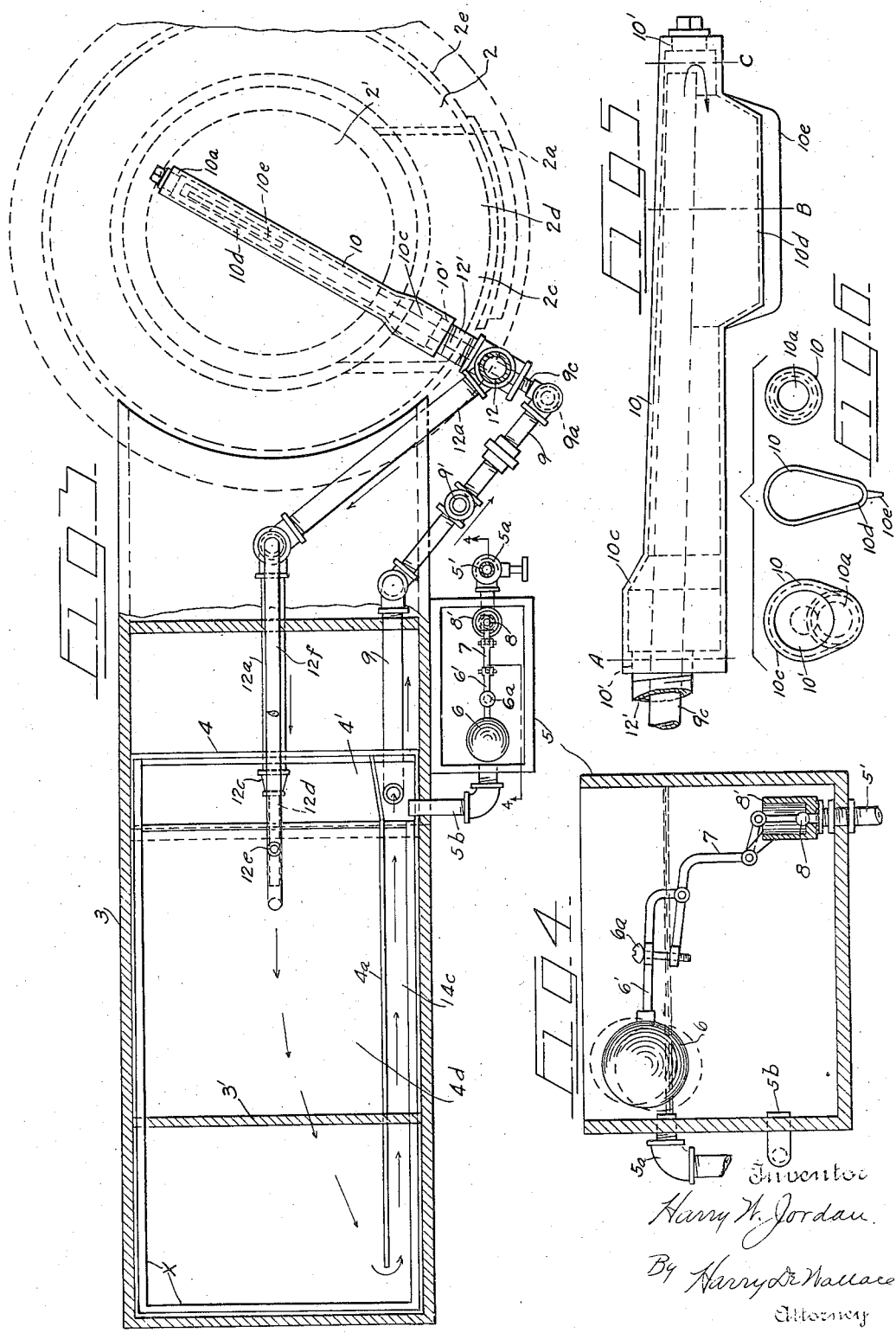

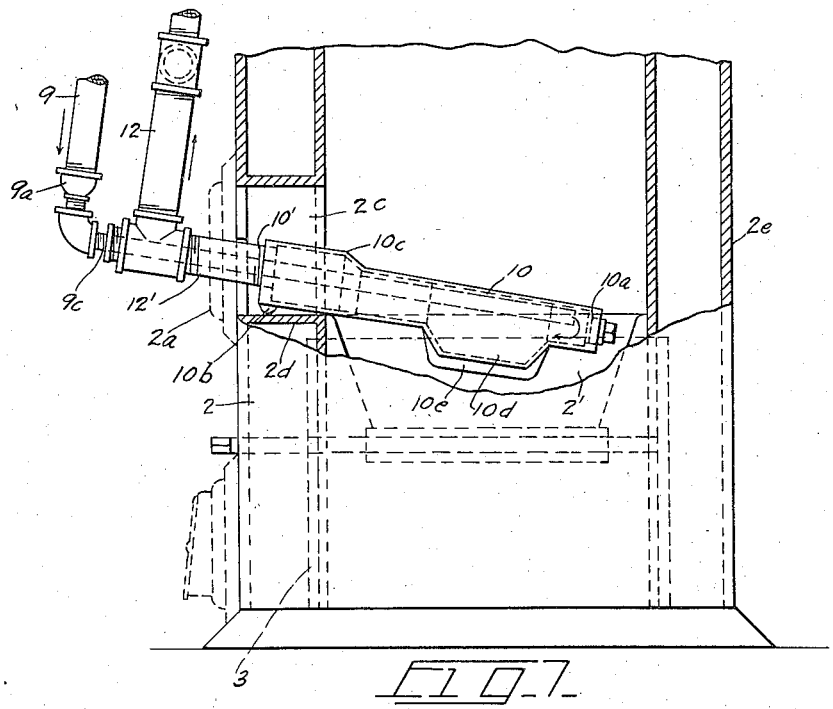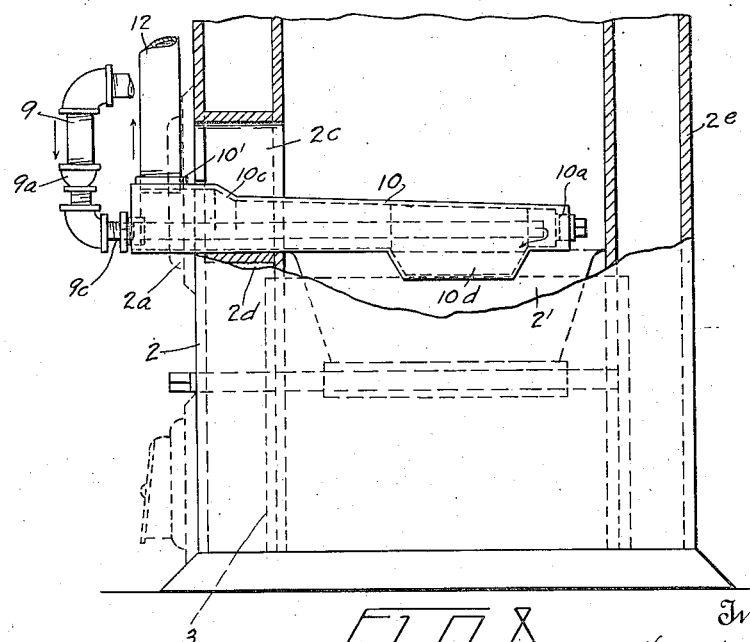

1,515,490

UNITED STATES PATENT OFFICE.

HARRY W. JORDAN, OF SYRACUSE, NEW YORK.

APPARATUS FOR HUMIDIFICATION OF AIR.

Application filed May 29, 1924. Serial No. 716,701.

*To all whom it may concern:*

Be it known that I, HARRY W. JORDAN, a citizen of the United States, residing at Syracuse, in the county of Onondaga and State of New York, have invented certain new and useful Improvements in Apparatus for Humidification of Air, of which the following is a specification.

This invention relates to apparatus for humidifying air, designed for use in dwellings and other buildings, occupied by people for living, sleeping and working, and has for its particular object to provide automatic means for raising the humidity of artificially heated enclosures, to practically the same degree of moisture saturation as summer air.

Outdoor air during summer, in the latitude of New York, for example, usually carries moisture equal to 55% to 70% of saturation. If the percentage of humidity exceeds 70%, the air feels muggy and uncomfortable; if it falls below 55%, it feels dry. Humidity of the air in houses and offices during summer is usually the same, or nearly the same, as that of outdoors. During winter the indoor, artificially heated air of houses, offices and buildings used for living, business or industry, usually carries moisture equal to only 25% to 40% of humidity saturation at the indoor temperatures, similar to that of summer, namely, 60° to 80° F. The reason for this low humidity indoors is that the outdoor air is low in moisture content, because the moisture has been chilled out of the air, consequently when it comes into artifically heated rooms and is raised to 60°, or higher, its relative humidity drops, so that it is much lower than summer air, at similar temperatures (60°–80°).

This artificially dry indoor air dries the passages of the nose, throat and lungs, and makes people susceptible to colds, coughs and other diseases of the respiratory tract. This extreme dryness of the air makes it necessary to carry temperatures higher than in summer, in order to maintain the same degree of warmth and bodily comfort, because the dry air dries the skin.

This evaporation of the moisture from the skin makes the occupants of the rooms feel cold, so that they raise the temperature of the artificially heated rooms still higher, in order to be comfortable. In so doing, the air is made proportionately drier and injurious to the respiratory tract. These conditions of overheated, excessively dry air, are among the causes of increase of sickness and disease in winter.

Another disadvantage of such artificially dry air is that it dries all wooden furniture and causes it to shrink and crack. In summer, the naturally moist air makes such articles swell. This annual shrinking and swelling is more destructive than the wear and tear from use, in many cases. Doors, windows and other wood-work of houses and buildings shrink in winter and admit cold air, thereby increasing the coal consumption to offset this entrance of cold to the interiors.

In order to overcome these and similar unhealthful and injurious conditions, I have devised a novel and effective method of adding humidity to the air of artificially heated rooms, thereby restoring summer humidity conditions. And to carry out the said method, I have devised apparatus for adding the humidity in a manner which is automatically regulated to the varying conditions of the outdoor air. My process and apparatus may be used to introduce and maintain any proportion of moisture in the air up to 100% saturation; but my experience has shown that 50% to 60% of humidity saturation is the most practical range for the air of houses and rooms occupied by people, awake or asleep. My process is especially adapted to buildings heated by warm-air furnaces. A particular advantage of my system is that dust is removed from the air by its contact with hot-water. This removal of dust also removes disease germs, since they are mainly attached to dust particles.

The prominent features of my invention are that, water is heated in a heating element of special design, the said element being located in or adjacent the fire-pot of the furnace or heater. This hot-water, or steam, is automatically circulated by gravity, to an evaporating pan, which is preferably located in the duct or pipe which carries air to the furnace. Here it gives up the water vapor or steam to the air, as the latter flows over the water in the pan, and then returns via the gravity circulating system to the heater. Water which is evaporated is replenished, preferably by a feed tank, which automatically admits fresh water to the circulating and evaporating system, at the same rate as it is evaporated and removed by the air. The air thus moistened passes without interruption to the furnace, and thence to the rooms of the artificially heated building, in the usual manner.

Another object of my invention is to provide means for maintaining automatically the desired range, 50% to 60% of humidity, in the artificially heated rooms throughout the heating season, as from early autumn to late spring, and to provide emergency control, by which the humidity may be reduced, if a change of conditions requires such reduction. A further object is to provide a heating element capable of giving a high degree of efficiency of heating, the said element being wholly or partially disposed in the fire-pot of a furnace, or like heater, without interference with the fire, or the feeding of the fuel; the said heating element consisting of a manifold of peculiar design, which is arranged interiorly for receiving, and heating the water of the humidifying system to any desired degree, and for effecting the circulation of the hot-water, with the assistance of gravity, in a manner that avoids noise and hammering.

A further object is to provide an evaporating pan, which is preferably metal lined with wood for holding the heat and thereby increasing evaporation, with means for effecting the circulation of the hot-water received from the heating element; the said pan being disposed in the air inlet duct at such a level relatively to the heating element that insures easy circulation of the water; the said pan being so positioned that all of the moisture evolved by evaporation may be added to the air before it enters the air-heating furnace. A novel and valuable feature of my evaporating system is that the hot-water delivered to the pan adds heat to the air, and does not depend upon the air to heat the water. This addition of the heated moisture to the air effects a considerable economy in room-heating, because its conversion into vapor, by the heating element buried in the fire of the furnace, requires less fuel proportionately than it does to introduce an equal amount of heat into the rooms in the form of direct heated air. A further object is to provide means for regulating the depth of the volume of air which flows over the evaporating pan, in order to vary the contact of air with the water, as may be desired.

A further object is to provide a water tank, by means of which the supply of water to the evaporating pan may be automatically maintained at any desired level; the said tank being equipped with adjusting means for varying the depth of the water from time to time.

I attain these objects by the means set forth in the detailed description which follows, and as illustrated by the accompanying drawings, in which—

Figure 1 is an elevational diagram of a hot-air furnace and the usual air duct, to which my improvement is applied; the air-duct being in vertical section, taken on line 1—1 of Fig. 2. Fig. 2 is a vertical section, taken on line 2—2 of Fig. 1. Fig. 3 is a horizontal section, taken on line 3—3 of Fig. 1. Fig. 4 is an enlarged vertical longitudinal section, taken on line 4—4 of Fig. 3. Fig. 5 is an enlarged side view of the heating element. Fig. 6 is a group of vertical cross-sectional views, taken respectively on lines A, B and C of Fig. 5. And Figs. 7 and 8 are similar broken elevational views of the furnace; showing different ways of disposing the heating element relatively to the fire-pot; also showing slight variations in the application and arrangement of the flow and return fittings.

In the drawings, 2 represents conventionally, an ordinary hot-air furnace or heater, 2' the fire-pot, 2$^a$ the fuel door, 2$^c$ and 2$^d$ respectively the doorway and the bottom ledge thereof, and 2$^e$ the usual outer jacket. 3 represents the usual air duct or conduit, by which the air to be warmed is supplied to the furnace. The humidification of the air, before it passes into the furnace, is effected by a number of parts, which will now be described:

4 represents a relatively large and shallow evaporating pan, having a normal depth of about four inches, which is preferably disposed in the air-duct at any suitable distance from the furnace, and at a sufficient height above the fire-pot 2' to insure positive and free gravitation of the water from the pan towards the fire-pot. The bottom and inner sides of the pan are preferably lined with wood $x$, which becomes saturated with the water, and tends to retain the heat, as well as to increase evaporation. At its end nearest the furnace, the pan 4 is depressed, thereby forming a leg 4', of considerable depth, which preferably extends the full breadth of the pan, and affords convenient means for applying the various connections and fittings, as shown in Figs. 1 and 3. In order to effect the highest degree of evaporation, the water in the pan 4 should be agitated or caused to circulate, and for this purpose, the pan is divided longitudinally by a partition 4$^a$, which extends from the near end to within a short distance of the remote end. This partition is disposed relatively close to the front side of the pan, thereby providing a narrow passage 4$^c$ for returning the unevaporated water towards the furnace. The supply of water is fed to the pan 4, by a tank 5, preferably secured to the outer side of the duct 3, which receives the fresh water through a pipe 5' and a cock 5$^a$, and supplies the water intermittently, or at the rate of evaporation to the pan 4, through a pipe 5$^b$, the latter pipe preferably discharging the water into the leg-portion of the return passage 4ᶜ, where the contents of the pan are coldest. The depth of water in the main portion of the pan, I find by experience, should be about one-quarter inch. The level of water in the pan (and tank) is kept at normal (see Fig. 2), by means of a float 6, which is mounted on a rod 6′, the latter having its outer end bent downwardly and pivoted to a Z-shaped lever 7. An adjusting screw 6ᵃ serves to raise and lower the float, as shown by dotted lines in Fig. 4, for varying the level of the water in the pan 4. The lever 7 is shown pivoted to the top of the casing 8′ of a ball-cock 8, and supports the ball valve. 5ᶜ represents an over-flow pipe, which prevents the over-flowing of the pan 4. The large arrows in Fig. 1 indicate the normal course of the air towards the furnace. It is esential that the delivery of air to the evaporating pan 4 should be in a volume amply proportionate to the total area of the hot-air pipes that lead away from the furnace, and it is highly important that this large volume of air be spread out in a relatively thin layer, as it passes over the hot-water in the pan, in order to insure the maximum contact of air with the water. This is done to best advantage by reducing the air-duct 3, by extending the vertical wall 3′ downwardly from the horizontal wall 3ᵃ, to a point near the top of the pan 4, as shown in Fig. 1, and to the lower end of the wall 3′ is also hinged a gate 3ᶜ, which may be raised or lowered, for still further regulating the depth of the layer of air that passes over the open top of the pan (see Fig. 1).

In order to control or check humidification, if for any reason it becomes excessive, the air-duct 3 is equipped with two doors, 3ᵈ and 3ᵉ. The door 3ᵈ is preferably located above and beyond the hot-water inlet end of the pan 4, and close to the top-portion of the duct 3, so that when opened, humid air and water vapor can escape to the atmosphere. The door 3ᵉ is preferably located below the level of the pan 4 and nearer the furnace, so that when this door is opened, air is admitted to dilute the humid air and thus reduce the relative humidity. The door 3ᵈ may also be employed for inspecting the air-duct, the pan and its connections, as well as the mixing of the air, steam and water vapor.

The water for my humidifier is conducted from the evaporating pan towards the furnace 2, by a pipe-line 9, which is provided with a faucet 9ʳ for drawing off the water from the circulating system. The pipe 9 taps the near end of the return passage 4ᶜ of the pan, and discharges the cooled water into a novel heating element, which is disposed in the furnace, as shown in Figs. 1, 3, 7 and 8.

The heating element, in its preferred form, as best seen in Figs. 3, 5, 6 and 7, consists of a single elongated hollow (cast) iron body 10, in which the water of the system is heated. The body 10 is preferably disposed wholly within the door-way 2ᶜ and the fire-pot 2′, in a manner to extend well into the fire, as shown in Figs. 3 and 7. The body 10 has openings 10′ and 10ᵃ in its opposite ends; the latter opening being provided mainly for convenience in casting, and for inspecting and cleaning the body, and is usually sealed by a plug, as shown. The opening 10′ is relatively large and preferably threaded to receive a nipple 12′, which forms part of a pipe-line 12, by which the hot-water and steam are conducted from the furnace to the evaporating pan 4. The outlet end of the body 10 preferably rests upon the ledge 2ᵈ, and may be formed with a depending lug 10ᵇ, for positioning the element at an angle, as shown in Fig. 7. The remote end of the body 10 extends well across the fire-pot, and may be partially or wholly covered with the fuel. When the connecting pipes and other fittings are installed, these and the ledge 2ᵈ tend to hold the heating element without requiring other support. The water from the pipe-line 9 is discharged into a reducer 9ᵃ, from which a relatively small pipe 9ᶜ extends through the nipple 12′ and into the body 10 to within an inch or two of its remote end, where it discharges the water returning from the pan 4, to be reheated, and so on. After leaving the pipe 9ᶜ, the water gravitates back through the body 10 towards the exit opening 10′. In order to facilitate the ready and noiseless flow of the hot water and steam within and from the heating element, the top of the body 10 gradually slopes upwardly from the inner end towards the outlet end, and for a short distance the said top rises abruptly, as at 10ᶜ, for further relieving the pressure and effecting the noiseless flow of the products of the heating. In order to prevent hammering, which usually occurs in water heaters, when the steam becomes trapped in certain portions of the heating element, as 10ᶜ, the nipple 12′ is inserted as near the top of the cavity 10ᶜ as possible. The efficiency of my heating element is enhanced, by forming the bottom of the body 10 with a hollow tapering depending portion 10ᵈ, which is arranged to contain a relatively thin body of water, and which sinks still deeper into the fire. The radiating or heat-conducting surface of the element may be still further increased by adding to the bottom margin of the leg 10ᵈ, a relatively thin fin or rib 10ᵉ. By experience I have found that the water in the evaporating pan 4 should be maintained within the range of 120° to 200° F., depending upon the season of the year, and the humidity of the outdoor air. To keep the water in the pan within the said range of temperature, requires that the element 10 be disposed in or close to the hottest zone of the furnace fire. This can only be done in a practical manner by disposing the element at the level of the doorway ledge 2ᵈ, or still lower (see Fig. 7), and to circulate the hot water in the manner herein shown, rather than by the old style coils in common use for heating water for storage systems. My heating element is not a coil, and does not function like the ordinary coils referred to, and is not, according to the present invention, intended for use in connection with hot-water storage tanks, unless such use includes the association of the present circulating system.

From the heating element 10, the flow-line rises substantially vertically to a point near the top of the furnace, where it terminates in a filling-cup 13, which is controlled by a valve 13'. The cup 13 is employed for feeding small quantities of water to the element 10, when the latter is empty and hot, without danger of cracking the element. After the body 10 becomes suitably charged with the priming water, the faucet 9' may be closed and the water-supply cock 5ᵃ opened, for starting the humidifying of the air. At a convenient point below the valve 13', the flow-pipe 12 is tapped by a pipe 12ᵃ, preferably somewhat smaller in area, which carries the products of the heater 10 horizontally into the leg 4' of the pan 4. Inside the pan, the pipe 12ᵃ is fitted with a reducer 12ᶜ, the latter connecting with a relatively small caliber pipe 12ᵈ which discharges the hot-water at the top level of the wooden bottom 4ᵈ of the pan. The nozzle 12ᵈ is of such shape and is so positioned that it may be rocked laterally relatively to the floor 3ᵈ (see Fig. 2), for varying the elevation of the discharge. It is important that the discharge from the nozzle 12ᵈ be effected in a manner to cause the hot water to flow towards the farther end of the pan 4 in a steady stream (see arrows in Fig. 3) of sufficient force to agitate the relatively thin mass of water in the evaporating section of the pan, and to induce the return flow of unevaporated water through passage 4ᶜ, as explained. Immediately below the valve 13', the pipe 12 is tapped by a vent pipe 12ᵉ, which relieves the main pipe of any steam pressure that may accumulate between pipe 12ᵃ and cup 13. This steam is then carried by pipe 12ᵉ into the air duct 3, where it is preferably discharged near the outlet end of pipe 12ᵈ. The pipe 12ᵃ, at a point intermediate the pipe 12 and the pan 4, is tapped by a small-bore relief pipe 12ᶠ, which discharges the steam and water vapor near the water level, as shown in Fig. 1. The circulating system, comprising the pan 4, pipes 9, 9ᶜ, heating manifold 10, pipes 12 and 12ᵃ, is normally open and free throughout; the feed water supply and the drawing off of the water from the system, being controlled by the cock 5ᵃ and the faucet 9', the latter being used mainly for draining the pan 4 and tank 5.

Having thus described my invention, what I claim, is—

1. Means for humidifying air, including a water heating element adapted to be disposed in the fire-pot of a furnace, an evaporating pan adapted to be disposed in the fresh air duct of the furnace adapted to receive the products of the heating element and to give off hot moisture to the air as it passes over the pan, and means for regulating the depth of the volume of air passing over the pan.

2. Means for humidifying air, including a water heating element adapted to be disposed in the fire-pot of a furnace, an evaporating pan adapted to be disposed in the fresh air duct of the furnace adapted to receive the products of the heating element and to give off hot moisture to the air as it passes over the pan, means for returning the unevaporated water from the pan to said element to be reheated, and means for automatically controlling the level of the water in the pan.

3. Apparatus for humidifying air supplied to hot-air furnaces, comprising a water heating element adapted to be inserted in the fire-pot of the furnace, an evaporating pan adapted to be disposed in the fresh air duct adapted to be partially filled with hot-water constantly flowing from said element for moistening the air as it passes over said pan, means for effecting the gravitative return of the unevaporated water to said element in a continuous stream, and means for varying the depth of the volume of air passing over said pan.

4. Apparatus for humidifying the air of artificially heated buildings, comprising a water heating element adapted to be positioned in the fire-pot of a hot-air furnace, an evaporating pan adapted to be disposed in the duct that carries fresh air to the furnace to be heated and distributed throughout the building, said pan adapted to receive hot water and steam from said element, means for effecting the flow of the air over the hot contents of the pan in a relatively thin layer for effecting the commingling of the air with the steam and water vapor for raising the temperature and for increasing the moisture saturation of the air before it enters the furnace, and a series of flow and return pipes connecting said element and said pan for effecting the uninterrupted gravity circulation of the humidifying fluid.

5. Apparatus for adding moisture to the air before it is heated by a furnace or other heater, comprising an evaporating pan adapted to be disposed in the fresh air conduit of the furnace, a water heating element adapted to be disposed across the fire-pot of the furnace for providing hot water and steam for partially filling said pan, means for directing a relatively thin layer of the air across said pan in close contact with the surface of the hot water, and means connecting the heating element with said pan for effecting the continuous circulation of the humidifying fluid by gravity.

6. Means for adding moisture to the air of artificially heated buildings, comprising an evaporating pan adapted to be located in the fresh-air conduit of a furnace adapted to be partially filled with hot water, means for effecting the flow of the air across the open top of the pan and close to the surface of the hot water in a relatively thin layer, means for heating the water and for flowing the same to the pan by gravity, means for agitating and circulating the water throughout the length of the pan for increasing evaporation, and means for varying the degree of moisture saturation of the air delivered by the furnace to the building to correspond to the moisture content of the outdoor air.

7. Means for heating and adding moisture to the air of artificially heated rooms by passing the air over hot water, which comprises in combination with a hot-air furnace and a conduit for supplying fresh air to the furnace, an evaporating pan located in said conduit adapted to be partially filled with the hot water, a water heating element disposed in the fire-pot of the furnace, a flow-pipe for conducting the products of the element to said pan, a return pipe for carrying the unevaporated water from the pan to the element, and automatic means for replenishing the water of the circulating system wasted through evaporation.

8. The combination with a hot-air furnace and a duct for supplying air to the furnace, of a humidifying system comprising an evaporating pan adapted to be disposed in said air duct over which the air passes and becomes saturated with moisture before it reaches the furnace, said pan being lined with wood for retaining the heat and for increasing evaporation, a feed-water tank for automatically controlling the level of the water in the pan, means carried by said duct for drawing off a portion of the steam and water vapor above the level of the pan, means located below the pan for diluting the moistened air by admitting fresh air to the duct, a water heating element located in the fire-pot of the furnace adapted to supply hot-water and steam to said pan, and means for returning the unevaporated water from the pan to said element for reheating.

In testimony whereof I affix my signature.

HARRY W. JORDAN.